Patented May 31, 1932

1,861,320

UNITED STATES PATENT OFFICE

ALFRED RHEINER, OF BASEL, SWITZERLAND, ASSIGNOR TO THE FIRM CHEMICAL WORKS FORMERLY SANDOZ, OF BASEL, SWITZERLAND

PROCESS FOR THE PREPARATION OF EFFECT THREADS

No Drawing. Application filed June 16, 1927, Serial No. 199,415, and in Germany November 13, 1926.

Several processes are known to prepare effect threads, by esterifying cellulose, which do not show affinity for substantive dyestuffs. For example aromatic carboxylic and sulphonic acid chlorides have been used for the esterification. The cellulose is first alkalized and the esterification is then carried out by treating the alkalized cellulose with a solution of an acid chloride in an indifferent solvent. This process is complicated as it has to pass through two reactions and requires a complicated apparatus on account of the organic solvents.

These disadvantages can be avoided with processes where acetic anhydride is used for the esterification, whereby the cellulose is transformed in one single operation and without structural alteration into its mono- and diacetylesters.

According to the process as described in the German specification No. 224,330 cellulose is impregnated with an acetylation mixture, which consists of acetic anhydride, acetic acid and a salt like condensation agent, then squeezed out until a certain increase in weight is obtained and afterwards acetylized by gently warming up in a closed room. This process necessitates a complicated apparatus. Further, irregularly acetylized fibres are thus obtained, possessing in places no affinity for substantive dyestuffs, whereas other parts again are dyed to a vigorous shade. This results from the fact that the acetylation mixture remains irregularly distributed either during the squeezing out or during the acetylation in the thermostat. For this reason, the process has not found general use. (See expert evidence in Journ. of the Soc. of Dyers and Colorists 23, 250 (1911) and German specification No. 347,130.)

According to the process as described in the German specification No. 347,130 cellulose is impregnated with a catalyzer and afterwards partially esterified in the vapour of acetic anhydride boiling under reduced pressure. The process also requires a complicated apparatus, because it is necessary to avoid an extraction of the catalyzer in some parts of the fibres by the boiling acetic anhydride and an increase thereof in other parts.

According to other processes, the acetylation is carried out in the acetylation mixture itself, but in such cases, only weakly acting catalyzers are used with accordingly higher temperature. For instance, sodium acetate is used as a weak catalyzer at 140° C. (Cross and Bevan, Researches on Cellulose, 1895–1900, II Ed., pag. 40) or heavy metal salts of organic acids, such as zinc acetate at 70-75° C. (German specification No. 380,994). Some processes again work without any catalyzer (Cross and Bevan, Researches on Cellulose 1900-1905, pag. 11, and German specification No. 380,994). The acetylation in these cases takes place only very slowly in spite of the high reaction temperatures and a damage of the fibres cannot be avoided.

The above described processes have, therefore, this in common that they all try to prevent the dissolution of the ester formed in the acetylation mixture. This is realized by carrying out the acetylation outside the acetylation mixture (German specifications Nos. 224,330 and 347,130) or by using weakly acting catalyzers (Cross and Bevan and German specification No. 380,994), the opinion, hitherto predominant being that it would not be possible to produce mono- and diacetyl cellulose directly by laying cellulose into an acetylation mixture containing catalyzers as used for the preparation of cellulose triacetate (see Hottenroth, Die Kunstseide, 1926, page 354).

The reaction has been considered as taking place in the following manner: Upon immersing the cellulose into an acetylation mixture, the outer layer thereof only is completely esterified to cellulose triacetate, whilst the interior part remains unaltered. After the swelling up and the dissolution of the completely esterified coating has taken place, a new layer of unaltered cellulose is laid open on which the same phenomenon, as shown, is repeated, until the whole fibre is dissolved (see Germany specification No. 139,669; Schwalbe Zeitschrift für angewandte Chemie, Bd. 24, 1256 (1911), Clément-Rivière, Matières plastiques 1924, 215) or at least swollen up to such an extent that the original strength and elasticity is lost (see Clément-Rivière, page 236).

It has now unexpectedly been found that this conception of the acetylation process is wrong and that it is possible to transform cellulose into its mono- and diacetate by placing it into an acetylation mixture, consisting of acetic anhydride, acetic acid and one of the catalyzers as usually employed for the preparation of cellulose triacetate, whereby no cellulose is lost and the original form, strength and elasticity are maintained.

Precautions to avoid the dissolution of the fibres are not only superfluous, as the lower acetylation products of cellulose, which are first produced, are insoluble in the acetylation mixture, but rather injurious because they would needlessly delay the acetylating operation.

Keeping this in mind, the carrying out of the new process is very simple: Cellulose in any form (loose material, yarns, fabrics, dryed, wet, raw, bleached, dyed) is left in an acetylation mixture consisting of acetic anhydride, acetic acid and a suitable quantity of one of the usual catalyzers only until the desired mono- or diacetylation is reached. The material, which remains unaltered in its structure, is then taken out of the liquid, the adhering acetylation mixture is removed by squeezing out, pressing or hydroextracting and afterwards washed. The acetylation mixture may be used again after compensation of the loss of acetic anhydride and catalyzer.

Acceleration of the acetylation may be obtained by the use of any catalyzers which have so far been proposed for the preparation of cellulose triacetate with the restriction, however, that the quantity of the very strongly acting catalyzers be diminished in order to obtain a uniform acetylation.

The technical advantages of the new acetylation process over the already known methods are considerable and the performance of the process is exceedingly simplified.

According to this process, completely uniform cellulose mono- and diacetates are obtained, which possess the form, strength and elasticity of the original material and entirely reserve substantive dyestuffs. The proof of the uniformity of the acetylation has been shown by a microscopic examination of a cross section of a fibre dyed with a basic dyestuff. This cross section appeared to be thoroughly and uniformly penetrated by the colour.

The process enables the carrying out of the reaction at ordinary room temperature, whilst the hitherto known processes use higher temperatures.

The required apparatus consists of a closed vessel containing the acetylation mixture, of a device of any kind to remove the adhering liquid and of a washing trough. This great simplicity of the apparatus must be considered as an important technical progress over the hitherto known processes, as on account of the high corrosive activity of the acetylation mixture one is greatly limited in the choice of the materials of construction.

The herein described process has the advantage over the processes working with carboxylic and sulphonic acid chlorides, that no alkalization is necessary and that it is cheaper and yields effect threads with more favorable and valuable properties.

The following examples illustrate the new process, whereby the specified proportions may vary.

*Example 1*

1 kg. of loose cotton is put into an acetylation mixture of 3 kg. of acetic anhydride, 5 kg. of glacial acetic acid and 2.5 g. of sulphuric acid, which is contained in a closed earthenware vessel, not effected by acids, so that the fibres are completely covered by the liquid. The acetylation being effected at 15° C., a dyeing test is taken after two days to ascertain whether the acetylation is sufficient to reserve the fibre completely against substantive dyestuffs. If this is the case, the material, which is unaltered in its structure, is taken out of the acetylation mixture, the adhering liquid squeezed out as completely as possible and the fibre is washed.

Instead of the small quantity of sulphuric acid, corresponding quantities of other catalyzers may be used, for instance catalyzers of which the catalytic effect are also based on their acid character, as for instance halogen acids, nitric acid, phosphoric acid, sulphoacetic acid, halogenated fatty acids, aromatic sulphonic and sulphinic acids, acid or neutral esters of strong acids, acid chlorides, acid salts, salts of strong acids with weak bases or also neutral salts of which the ions are strongly neutralized and so on, in general all catalyzers of strong action which have been proposed for the preparation of cellulose triacetate, those heavy metal salts of organic acids which have already been used for the preparation of cellulose mono- and diacetate including sodium acetate being however excepted.

*Example 2*

1 kg. of bleached cotton yarn is transformed into the cellulose monoacetate by leaving it for twenty hours in a warm acetylation mixture of 25° C., consisting of 4 kg. of acetic anhydride, 4 kg. of glacial acetic acid and 0.8 kg. of zinc chloride. The adhering liquid is then hydroextracted as completely as possible and the yarn washed. After drying 1.2 kg. of yarn are obtained, the outside aspect of which is unchanged, but which is refractory to substantive dyestuffs.

What I claim is:

A process for the preparation of effect threads, having no affinity for substantive dyestuffs and consisting of the lower acetylated derivatives of cellulose, by the direct acetylation of cellulosic fibers without altering the physical characteristics of such fibers, the reaction being effected in a single acetylating bath, said process comprising immersing natural cellulosic fibers in a quantity of acetylating mixture containing an amount of acetic anhydride considerably in excess of that theoretically required to form the said derivatives, said mixture consisting of acetic anhydride, glacial acetic acid and an acetylating catalyst, the fibers being entirely covered by and in contact with excess of acetylating mixture throughout the course of the reaction; allowing the acetylating mixture to react on the fibers only until the mono- and di-acetyl derivatives of cellulose have formed; and thereupon separating the resultant effect thread from the excess of acetylating mixture.

In witness whereof I have hereunto signed my name this 2d day of June, 1927.

ALFRED RHEINER.